United States Patent [19]

Halasa et al.

[11] Patent Number: 5,595,951
[45] Date of Patent: Jan. 21, 1997

[54] PROCESS FOR PREPARING A MULTILITHIO INITIATOR FOR IMPROVED TIRE RUBBERS

[75] Inventors: Adel F. Halasa, Bath; George Jalics, Akron, both of Ohio

[73] Assignee: The Goodyear Tire & Rubber Company, Akron, Ohio

[21] Appl. No.: 405,125

[22] Filed: Mar. 16, 1995

[51] Int. Cl.⁶ .......................................... C08F 4/48
[52] U.S. Cl. .......................... 502/154; 502/157; 526/174; 526/175; 526/180; 526/337; 526/340; 260/665 R
[58] Field of Search ................................ 502/152, 154, 502/155, 157; 526/335, 340, 340.2, 174, 175, 180; 525/361, 333.2; 260/665 R

[56] References Cited

U.S. PATENT DOCUMENTS

| | | | |
|---|---|---|---|
| 3,215,679 | 11/1965 | Trepka | 526/175 |
| 3,321,479 | 5/1967 | Eberhardt et al. | 526/180 X |
| 3,674,895 | 7/1972 | Gaeth et al. | 526/180 |
| 3,776,893 | 12/1973 | Naylor et al. | 526/174 |
| 3,781,260 | 12/1973 | Halasa | 525/361 X |
| 3,925,511 | 12/1975 | Loveless | 525/361 X |
| 4,078,019 | 3/1978 | Langer, Jr. | 526/180 |

OTHER PUBLICATIONS

The Merck Index (9th ed.) pp. 1133–1134 (1976).

*Primary Examiner*—Fred Teskin
*Attorney, Agent, or Firm*—Alvin T. Rockhill

[57] ABSTRACT

The subject invention discloses a process for preparing an initiator which contains a plurality of lithium atoms and which is particularly useful for initiating the polymerization of diolefin monomers into rubbery polymers; said process being comprised of reacting an alkyl lithium compound with an unsaturated hydrocarbon containing allylic, benzylic or aryl hydrogen atoms, wherein said process is conducted in the presence of a member selected from the group consisting of alkali metal alkoxides, alkali metal phenoxides, and chelating tertiary alkyl 1,2-ethylene diamines. After the initiators of this invention have been prepared they can be employed to initiate the polymerization of diolefin monomers into rubbery polymers. They can, of course, also be employed to initiate the copolymerization of diolefin monomers and vinyl aromatic monomers into rubbery polymers. These rubbery polymers can then be used in making tire tread compounds for automobiles and trucks. They offer the advantages of better processability, treadwear characteristics, and abrasion resistance.

6 Claims, No Drawings

PROCESS FOR PREPARING A MULTILITHIO INITIATOR FOR IMPROVED TIRE RUBBERS

BACKGROUND OF THE INVENTION

Organometallic compounds of Group I metals, such as lithium, are widely used to initiate the anionic polymerization of diolefin monomers into rubbery polymers. For instance, alkyl lithium compounds are widely used on a commercial basis to initiate polymerizations of conjugated diolefin monomers and copolymerizations of conjugated diolefin monomers with vinyl aromatic monomers. For example, n-butyl lithium can be employed to initiate the copolymerization of 1,3-butadiene monomer and styrene monomer in the synthesis of styrene-butadiene rubber.

The organometallic compounds which are used to initiate such polymerizations generally only contain one lithium atom per molecule. Alkyl lithium compounds having the formula Li—R, wherein R represents as alkyl group containing from 2 to 8 carbon atoms, are the most widely used initiators of this type. Their utilization normally results in the production of a polymer which is linear rather than branched. To improve polymer performance characteristics polymers made with such monolithium compounds are often branched or coupled by the addition of coupling agents, such as silicon tetrachloride or tin tetrachloride. Multifunctional compounds, such as divinyl benzene, are sometimes included as a polymerization ingredient to induce branching.

It is also known in the art that compounds which contain multiple lithium atoms can be used to initiate polymerizations and that the polymers produced by such polymerizations are branched. For instance, U.S. Pat. No. 5,262,213 discloses the use of organo multifunctional lithium compounds as polymerization initiators. U.S. Pat. No. 5,262,213 indicates that these multifunctional lithium compounds will typically be organodilithium compounds or organotrilithium compounds. These multifunctional organolithium compounds include as representative examples 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl.

The employment of organodilithium compounds as polymerization initiators does not result in the formation of branched polymers. However, organolithium compounds which contain three or more lithium atoms will normally be branched. The number of branch sites in the polymer produced will normally be equal to the number of lithium atoms in the organolithium compound minus two.

SUMMARY OF THE INVENTION

The subject invention discloses a process for preparing an initiator which contains a plurality of lithium atoms and which is particularly useful for initiating the polymerization of diolefin monomers into rubbery polymers; said process being comprised of reacting an alkyl lithium compound with an unsaturated hydrocarbon containing allylic, benzylic or aryl hydrogen atoms, wherein said process is conducted in the presence of a member selected from the group consisting of alkali metal alkoxides and tertiary chelating alkyl 1,2-ethylene diamines, such as tetramethyl ethylenediamine.

After the initiators of this invention have been prepared they can be employed to initiate the polymerization of diolefin monomers into rubbery polymers. They can, of course, also be employed to initiate the copolymerization of diolefin monomers and vinyl aromatic monomers into rubbery polymers. These rubbery polymers can then be used in making tire tread compounds for automobiles and trucks. They offer the advantages of better processability, treadwear, tear, characteristics, and abrasion resistance.

DETAILED DESCRIPTION OF THE INVENTION

The initiators of this invention are prepared by reacting an unsaturated hydrocarbon containing allylic, benzylic or aryl hydrogen atoms with an alkyl lithium compound in the presence of an alkali metal alkoxide or tetramethyl ethylenediamine (TMEDA). This reaction will normally be carried out in a hydrocarbon solvent which can be one or more aromatic, paraffinic, or cycloparaffinic compounds. These solvents will normally contain from 4 to 10 carbon atoms per molecule and will be liquids under the conditions of the reaction. Some representative examples of suitable inert organic solvents include pentane, isooctane, cyclohexane, normal hexane, benzene, toluene, xylene, ethylbenzene, and the like, alone or in admixture. The reaction will typically be conducted in a liquid aliphatic or cycloaliphatic compound. Hexane and cyclohexane are representative examples of preferred inert organic solvents which can be employed.

The unsaturated hydrocarbon will typically contain a plurality of allylic, benzylic or aryl hydrogen atoms. Oligomers or polymers of conjugated diolefin monomers which have a molecular weight which is within the range of about 200 to about 5000 will normally be employed as the unsaturated hydrocarbon compound. A minimum molecular weight of about 200 is normally required to attain good solubility in standard polymerization mediums, such as hexane. On the other hand, if the unsaturated polymer has a molecular weight of over about 5000 the initiator becomes too viscous. It is normally preferred for the unsaturated hydrocarbon to have a molecular weight which is within the range of about 500 to 2000. Low molecular weight polyisoprene and low molecular weight polybutadiene are representative examples of preferred unsaturated hydrocarbons which can be employed. Low molecular weight polybutadiene is most preferred because it is easier to metalate than low molecular weight polyisoprene.

It is preferred to employ an alkali metal alkoxide or an alkali metal phenoxide rather than a tertiary chelating alkyl 1,2-ethylene diamine, such as TMEDA. The alkali metal in the alkali metal alkoxide can be sodium, potassium, rubidium or cesium. It is typically preferred for the alkali metal to be potassium or sodium. The alkali metal alkoxide will typically contain from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Potassium t-amyloxide (potassium t-pentoxide) and sodium t-amyloxide (sodium-pentoxide) are highly preferred alkali metal alkoxides which can be utilized in preparing the initiators of this invention. The alkali metal phenoxide can be a substituted phenoxide containing from 7 to about 20 carbon atoms.

The molar ratio of the alkali metal alkoxide, alkali metal phenoxide, or chelating tertiary alkyl 1,2-ethylene diamine to the alkyl lithium compound will normally be within the range of about 1:5 to about 1:200. Molar ratios of greater than 1:5 are not practical because of economic factors and because high levels of the alkali metal alkoxide or TMEDA can modify subsequent polymerizations where the initiator is employed. Molar ratios of less than 1:200 are not practical due to the high reaction temperatures which would be required. For these reasons a molar ratio of the alkali metal alkoxide, alkali metal phenoxide, or chelating tertiary alkyl 1,2-ethylene diamine to the alkyl lithium compound which is within the range of about 1:10 to about 1:100 are preferred. It is most preferred for this molar ratio to be within the range of about 1:15 to about 1:40.

The initiator will normally be prepared at a temperature which is within the range of about 20° to about 100° C. in cases where TMEDA is employed. In cases where an alkali metal alkoxide is utilized the reaction between the unsaturated hydrocarbon and the alkyl lithium compound will normally be carried out a temperature which is within the range of about 60° C. and 250° C. In such cases it is preferred for this reaction to be conducted at a temperature which is within the range of about 80° C. to 200° C. with temperatures within the range of 100° C. to 150° C. being most preferred.

After the initiators of this invention have been prepared they can be employed to initiate the polymerization of diolefin monomers into rubbery polymers. They can, of course, also be employed to initiate the copolymerization of diolefin monomers and vinyl aromatic monomers into rubbery polymers. These rubbery polymers can then be used in making tire tread compounds for automobiles and trucks. They offer the advantages of better processability, treadwear, tear, characteristics, and abrasion resistance.

The initiators of this invention can be employed in to synthesize rubbery polymers using standard solution polymerization techniques. Such solution polymerizations will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent and the monomers. In most cases, it will be preferred for the polymerization medium to contain from 10 to 30 weight percent monomers. It is generally more preferred for the polymerization medium to contain 20 to 25 weight percent monomer.

The monomer charge compositions utilized in synthesizing styrene-butadiene rubber with the initiators of this invention will typically contain from about 10 weight percent to about 20 weight percent styrene and from about 80 weight percent to about 90 weight percent 1,3-butadiene monomer. It is typically preferred for the monomer charge composition to contain from about 16 weight percent to about 19 weight percent styrene and from about 81 weight percent to about 84 weight percent 1,3-butadiene. It is generally more preferred for the monomer charge composition to include about 18 weight percent styrene and about 82 weight percent 1,3-butadiene.

It is generally advantageous to utilize to initiators of this invention in continuous polymerization processes. However, the initiator of this invention can also be employed to initiate batch polymerizations. In continuous processes, the monomers and the initiator are continuously fed into a reaction vessel. The pressure in the reaction vessel is typically sufficient to maintain a substantially liquid phase under the conditions of the polymerization reaction. The reaction medium will generally be maintained at a temperature which is within the range of about 40° C. to about 150° C. throughout the polymerization. This is generally preferred for the polymerization to be conducted at a temperature which is within the range of about 60° C. to about 120° C.

The amount of organolithium initiator employed will be dependent upon the molecular weight which is desired for the rubbery polymer being synthesized. As a general rule in all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

The rubbery polymer produced is recovered from the organic solvent. It can be recovered from the organic solvent by standard techniques, such as decantation, filtration, centrification and the like. It is often desirable to precipitate the rubbery polymer from the organic solvent by the addition of lower alcohols containing from 1 to about 4 carbon atoms to the polymer solution. Suitable lower alcohols for precipitation of the rubbery polymer from the polymer cement include methanol, ethanol, isopropyl alcohol, n-propyl alcohol and t-butyl alcohol. The utilization of lower alcohols to precipitate the SBR from the polymer cement also "kills" the living polymer chains by inactivating lithium end groups. After the rubbery polymer is recovered from the organic solvent, steam stripping can be employed to reduce the level of volatile organic compounds in the rubber.

The rubbery polymers which are made utilizing the organolithium initiators of this invention are particularly valuable for use in making tires which display better wear and abrasion resistance. They also display excellent processability. These rubbery polymers can be blended with natural rubber and, optionally, synthetic rubbers, such as high cis 1,4-polybutadiene and/or styrene-butadiene rubber, in making tread compounds.

These blends can be compounded utilizing conventional ingredients and standard techniques. For instance, these rubbery polymer blends will typically be blended with carbon black, sulfur, fillers, accelerators, oils, waxes, scorch inhibiting agents, and processing aids. In most cases, the rubbery polymer containing blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The rubber blends made with the initiators of this invention can be used in tire treads in conjunction with ordinary tire manufacturing techniques. Tires are built utilizing standard procedures with the rubbery polymer made with the initiators of this invention simply being substituted for the rubber compounds typically used as the tread rubber. After the tire has been built, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

Preparation of Soluble Polyfunctional Initiator

In this experiment an organolithium initiator was synthesized utilizing the technique of this invention. In the procedure employed 10.25 g of freshly purchased squalene (25 mmole) was charged into an 8 ounce oven-baked bottle under nitrogen. Then 140 ml of dry hexane was added, followed by 62.5 ml of a 1.6M n-butyllithium (100 mole) and 7.5 ml of tetramethyl ethylenediamine (TMEDA, 49.7 mmole). The bottle was sealed with a teflon-lined cap and rotated in a polymerizer bath for 2 hours at 65° C. After cooling to room temperature, the content of the bottle was analyzed by gas chromatography (GC) for butane content. This was done by charging a rubber-capped cca 2 ml GC vial with 1 ml methanol and 0.5 ml of the initiator was syringed slowly into the liquid. For reference, 6 mls of n-pentane was added to the initiator bottle. Into another GC vial, 1 ml chlorotrimethylsilane was added and another 0.5 ml of the initiator was slowly syringed in under the surface. The butane content of the methanol vial gives the total lithium content, while the chlorotrimethylsilane vial gives only the butane content generated during the metallation. For this example, 93.4 percent metallation was obtained. The theoretical average functionality for this initiator is 4.0.

EXAMPLE 2

In this experiment the same procedure that was employed in Example 1 was utilized except that 2 g squalene (4.86 mmole), 170 ml hexane, 28 ml n-butyllithium and 2.8 ml TMEDA (18.5 mmole) was charged into the oven-baked bottle. After 4 hours at 65° C., the degree of metallation was found to be 71 percent and the theoretical functionality is 9.2.

EXAMPLE 3

In this experiment the same procedure that was employed in Example 1 was utilized except that 2 g squalene (4.68 mmole), 140 ml hexane, 56 ml 1.6M n-butyllithium (89.6 mmole) and 5.6 ml TMEDA (37.1 mmole) was charged into the oven-baked bottle. After 2 hours at 65° C., the degree of metallation was found to be 82.2 percent and the theoretical functionality is 18.4.

EXAMPLE 4

In this experiment the same procedure that was employed in Example 1 was utilized except that 2 g squalene (4.68 mmole), 120 ml hexane, 84 ml 1.6M n-butyllithium (134.4 mmole) and 8 ml TMEDA (53 mmole) were charged into the oven-baked bottle. After 5 hours at 65° C., the extent of metallation was found to be 77 percent with a theoretical functionality of 27.7.

EXAMPLE 5

Synthesis of Starbranched lithium polymers

The synthesis of this family of polymers with the multi-lithio initiators of this invention is no different than those using n-butyllithium, except for the presence of a small amount of TMEDA modifier. Such a use is illustrated with a 25/50/25 styrene-isoprene-butadiene rubber.

In this experiment a 5-gallon, thoroughly-dried, stirred reactor was charged with 8 kg of silica passed 15/85 monomer/hexane mixture with a 25/50/25 styrene/isoprene/butadiene ratio. The nitrogen-purged batch was then heated to 65° C. and 3.0 mls of the initiator made in Example 1 initiator was added after scavenging with n-butyllithium. Then 0.5 ml TMEDA (3.3 mmole) was added and the batch was polymerized to full conversion. Then the batch was shortstopped with 1 ml of isopropanol, 10 g of paratax was added and the cement was dried. The weight average molecular weight (Mw) of the polymer obtained was determined to be over one million by GPC using universal calibration.

EXAMPLE 6

In this experiment a low molecular weight solution styrene-butadiene rubber (Mn=10,000–20,000), containing 5–50 percent styrene, was made using TMEDA modified n-butyllithium. Upon completion of the polymerization, the homogenous solution was metallated with 6–12 lithium atoms per molecule in the presence of more TMEDA. (Li-TMEDA=0.2–2.0). The resulting polylithiated polymer was used as initiator for making highly branched multi-arm polymers of medium vinyl PBD and solution SBR containing 5–50 percent styrene.

EXAMPLE 7

In this experiment a low molecular weight polyisoprene rubber (Mn=10,000–20,000) was made using TMEDA modified n-butyllithium. Upon completion of the polymerization, the homogenous solution was metallated with 6–12 lithium atoms per molecule in the presence of more TMEDA. (Li-TMEDA=0.2–2.0). The resulting polylithiated polymer was used as initiator for making highly branched multi-arm polymers of medium vinyl PBD and solution SBR containing 5–50 percent styrene.

EXAMPLE 8

In this experiment a low molecular weight styrene-isoprene-butadiene rubber (Mn=10,000–20,000) was made using TMEDA modified n-butyllithium. Upon completion of the polymerization, the homogenous solution was metallated with 6–12 lithium atoms per molecule in the presence of more TMEDA. (Li-TMEDA=0.2–2.0). The resulting polylithiated polymer was used as initiator for making highly branched multi-arm polymers of medium vinyl PBD and solution SBR containing 5–50 percent styrene.

EXAMPLE 9

A 16-ounce bottle was charged with 400 ml of a properly purified and dried butadiene/hexane mixture, containing 40 g of 1,3-butadiene under nitrogen. Then 20 ml of a 1.6M n-butyllithium solution was added to the bottle which was capped and rotated. The monomer in the bottle was allowed to polymerize for 2 hours at a temperature of 65° C. When the polymerization was completed, the bottle is put in boiling water, an 18-gauge needle was inserted in the cap and the total volume reduced to about 140 ml. Then 28 ml more 1.6M n-butyllithium is added to the bottle, with 5 mls of 1.0M potassium tert amylate. After being capped the bottle was put in boiling water for another two hour period. The finished product is cca 200 ml of about 0.5M lithium solution, with an average functionality of 3.0.

The extent of the metallation was determined by titration as described in Example 1. Degrees of metallation of over 90 percent and up to 100 percent have been routinely obtained.

EXAMPLE 10

The procedure described in Example 9 was repeated in this experiment except that 44 ml of a 1.6M n-butyllithium solution was employed in the second addition. In this experiment there was determined to be a resulting lithium functionality of 4.0.

EXAMPLE 11

The procedure described in Example 9 was repeated in this experiment except that 60 ml of the 1.6M n-butyllithium solution was employed in the second addition. In this experiment there was determined to be a resulting lithium functionality of 5.0.

EXAMPLE 12

A 16-ounce bottle was charged with 400 ml of a properly purified and dried butadiene/hexane mixture, containing 40 g of 1,3-butadiene under nitrogen. Then 20 ml of a 1.6M n-butyllithium solution was added to the bottle which was capped and rotated. The monomer in the bottle was allowed to polymerize for 2 hours at a temperature of 65° C. When the polymerization was completed, the bottle is put in boiling water, an 18-gauge needle was inserted in the cap and the total volume reduced to about 140 ml. Then 28 ml more 1.6M n-butyllithium is added to the bottle, with 5 mls of 1.0M sodium tert amylate. After being capped the bottle was put in boiling water for another two hour period. The finished product is cca 200 ml of about 0.5M lithium solution, with an average functionality of 3.0.

The extent of the metallation was determined by titration as described in Example 1. Degrees of metallation of over 90 percent and up to 100 percent have been routinely obtained.

EXAMPLE 13

The procedure described in Example 10 was repeated in this experiment except that 44 ml of a 1.6M n-butyllithium solution was employed in the second addition and that sodium tert-amylate was employed in place of the potassium tert-amylate. In this experiment there was determined to be a resulting lithium functionality of 4.0.

EXAMPLE 14

The procedure described in Example 11 was repeated in this experiment except that sodium tert-amylate in place of the potassium tert-amylate. In this experiment there was determined to be a resulting lithium functionality of 5.0.

EXAMPLE 15

Unmodified Polybutadiene under continuous conditions

A reactor was charged with a 13 percent butadiene/hexane solution along with a multilithio initiator made by the technique of this invention having a functionality of 3. The target arm length was 167,000 and the total target molecular weight was 500,000. The reaction temperature employed was 170° F. with a monomer conversion of approximately 70 percent reached in the first reactor and a monomer conversion of approximately 93 percent being reached in the second reactor. The polybutadiene rubber produced was determined to have a glass transition temperature (Tg) of –95° C.

EXAMPLE 16

Modified Polybutadiene under Continuous Conditions

In this experiment a reactor was charged with a 13 percent butadiene/hexane solution, a multilithio initiator made by the technique of this invention having a functionality of 3, and TMEDA modifier (1/1 mole ratio to initiator). A reaction temperature of 170° F. was utilized for the polymerization. The reactor conversion reached 75 percent in the first reactor and 94 percent in the second reactor. Polymer glass transition temperatures ranged from about –95° C. to about –40° C., depending on amount of modifier added. A polybutadiene rubber having a glass transition temperature of about –95° C., an arm segment length of about 125,000 and a total molecular weight of 500,000 was made.

EXAMPLE 17

Modified Polystyrene/Polybutadiene Copolymer Under Continuous Conditions

In this experiment the first reactor was charged with a 13 percent monomer/hexane solution, a multilithio initiator having a functionality of 3 and TMEDA modifier (2/1 mole ratio to initiator) at a reaction temperature 170° F. The monomer is comprised of 12/88 weight percent styrene/butadiene. The monomer conversion from the first reactor was 78 percent and 95 percent from the second reactor. Target arm molecular weight was 167,000 with a total molecular weight of 500,000. The GPC molecular weight was 538,000 with a distribution 2.46. Polymer glass transition temperature ranged from −50° C. to −37° C.

EXAMPLE 18

Batch Polymerization of Modified Polystyrene/Polybutadiene

A reactor was charged with 2000 g of 13 percent 12/88 styrene/butadiene in hexane. The reactor was then heated to 150° F. To the reactor the following modifiers and initiator were added: 2.0 mls of 0.2M TMEDA, 2.0 mls of 0.5M NaOAm and 10.4 mls 0.2M multilithio initiator (functionality=3). The reaction was carried out to 98 percent monomer conversion. The polymer Tg was −37° C. Arm polymer chain length was 167,000, for a total molecular weight of 500,000. The distribution under batch conditions was 1.25.

EXAMPLE 19

This experiment was conducted utilizing the same procedure as was employed in Example 18 except that the functionality of the initiator was changed to 4. The arm length of the polymer produced decreased to 125,000.

EXAMPLE 20

This experiment was conducted utilizing the same procedure as was employed in Example 19 except that the functionality of the initiator was changed to 4. This caused the arm length of the polymer to decrease to about 100,000.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing an initiator which contains a plurality of lithium atoms and which is particularly useful for initiating the polymerization of diolefin monomers into rubbery polymers; said process being comprised of reacting an alkyl lithium compound with squalene, wherein said process is conducted in the presence of a substituted alkali metal phenoxide containing from 7 to about 20 carbon atoms.

2. A process for preparing an initiator as specified in claim 1 wherein said process is conducted at a temperature which is within the range of about 60° C. to about 250° C.

3. A process for preparing an initiator as specified in claim 2 wherein the molar ratio of the substituted alkali metal phenoxide to the alkyl lithium compound is within the range of about 1:5 to about 1:200.

4. A process for preparing an initiator as specified in claim 1 wherein the molar ratio of the substituted alkali metal phenoxide to the alkyl lithium compound is within the range of about 1:15 to about 1:40, wherein the alkyl lithium compound is n-butyllithium, and wherein said process is conducted at a temperature which is within the range of about 100° C. to about 150° C.

5. A process for preparing an initiator as specified in claim 1 wherein the molar ratio of the substituted alkali metal phenoxide to the alkyl lithium compound is within the range of about 1:10 to about 1:100.

6. A process for preparing an initiator as specified in claim 5 wherein said process is conducted at a temperature which is within the range of about 80° C. to about 200° C.

* * * * *